United States Patent [19]

Pontius

[11] Patent Number: 4,737,174
[45] Date of Patent: Apr. 12, 1988

[54] MULTI-MEDIA FILTER FRAME CONSTRUCTION

[75] Inventor: Harold T. Pontius, Dublin, Ohio

[73] Assignee: Columbus Industries, Inc., Ashville, Ohio

[21] Appl. No.: 4,598

[22] Filed: Jan. 20, 1987

[51] Int. Cl.$^4$ ............... B01D 53/04; B01D 46/12
[52] U.S. Cl. ............... 55/316; 55/387; 55/491; 55/493; 55/501; 55/511; 55/DIG. 31
[58] Field of Search ............... 55/316, 387, 490, 491, 55/493, 494, 499, 501, 511, DIG. 31, DIG. 35

[56] References Cited

U.S. PATENT DOCUMENTS

| | | | |
|---|---|---|---|
| 943,298 | 12/1909 | Brown | 55/DIG. 35 |
| 2,050,605 | 8/1936 | Gordon et al. | 55/511 X |
| 2,079,297 | 5/1937 | Manning | 55/491 X |
| 2,139,014 | 12/1938 | Greig | 55/490 X |
| 2,754,928 | 7/1956 | Hambrecht et al. | 55/491 X |
| 2,881,854 | 4/1959 | Uehre, Jr. | 55/316 |
| 2,945,554 | 7/1960 | Berly | 55/316 X |
| 2,973,831 | 3/1961 | Sprouse et al. | 55/491 |
| 3,107,990 | 10/1963 | Getzin | 55/491 |
| 3,418,794 | 12/1968 | Roberts | 55/501 |
| 3,509,696 | 5/1970 | Thompson | 55/501 X |
| 4,252,547 | 2/1981 | Johnson | 55/511 X |
| 4,340,402 | 7/1982 | Catron | 55/511 X |
| 4,514,197 | 4/1985 | Armbruster | 55/316 |
| 4,519,823 | 5/1985 | Kinney, Jr. et al. | 55/493 |
| 4,610,705 | 9/1986 | Sarnosky et al. | 55/493 X |

FOREIGN PATENT DOCUMENTS

| | | | |
|---|---|---|---|
| 479972 | 1/1952 | Canada | 55/491 |
| 597903 | 4/1978 | Switzerland | 55/493 |
| 1305711 | 2/1973 | United Kingdom | 55/316 |

OTHER PUBLICATIONS

Weather-Rite Filter Co., St. Paul, Minn., advertisement for the Double Scotch Frame & Filter System, 1/1/67.

Primary Examiner—Robert Spitzer
Attorney, Agent, or Firm—Francis T. Kremblas, Jr.

[57] ABSTRACT

A multiple stage filter assembly which combines a permanently framed particulate filter media layer with an odor and particulate removal filter media layer which is removably mounted to the particulate permanent filter frame in overlying relationship to the outer surface of the particulate layer. The odor removal filter media layer is held in position by a plurality of filter retaining members which cooperate with the main frame structure to provide support for the gaseous filter layer. The retaining members function in a manner which permits simple removal and replacement of the gaseous filter layer without disturbing the permanently framed particulate filter layer.

4 Claims, 1 Drawing Sheet

MULTI-MEDIA FILTER FRAME CONSTRUCTION

BACKGROUND

Non-removably mounted particulate and gaseous filter media have been housed in more or less conventional permanent frame constructions for many, many years. Such frames generally consist of metal channel members forming the four sides of a rectangular configuration with the edges of the filter media being disposed within the channels. Typically the side walls of the channel members are bent inwardly to firmly engage and fix the outer edges of a layer of filter media in position within the frame.

While this is generally a satisfactory construction for particulate filter media of relatively long life or which can be cleaned and re-used, it represents a considerable expense in those applications wherein the filter media is relatively short-lived. In such situations, a disposable and replaceable media is desirable.

In applications wherein a combination of particulate and gaseous filter media are required, it is not unusual for one or more types of such media to be relatively shortlived. In this situation, a less expensive disposable filter media held by an inexpensive throwaway frame construction is desirable.

However, prior frame constructions of the stronger permanent type do not readily permit removal and replacement of layers of filter media held therein and the less expensive disposable frame constructions are less sturdy, weak and otherwise not satisfactory for certain applications. The prior art has incorporated all filter media within a singular frame which must be thrown away when one or more of the filter media has served its useful life or to employ a separate filter frame for each type of media used.

In certain applications, it is desirable to provide multiple filter media in a given application wherein one of the media types are preferably disposable. Prior to the present invention a suitable frame construction which combines the desirable characteristics of a conventional strong metal frame with the desirability of employing one or more disposable layers of filter media has not been satisfactorily provided by those skilled in the art.

SUMMARY OF INVENTION

The present invention relates to an improved filter construction and particularly to a filter assembly employing a novel multiple filter media combination comprising a permanently framed layer of filter media and a layer of a removably mounted disposable filter media. The present invention includes a generally conventional metal frame adapted to permanently mount a particulate filter layer, typically expanded metal for example. Such a filter construction is sturdy and long lasting. In accordance with the present invention, a second filter media layer is removably mounted in parallel overlying relationship to the particulate filter layer. Preferably, the removably mounted filter layer comprises a gaseous filter media typically employed to remove odors and requires more frequent replacement due to a shorter useful life compared to the particulate filter.

The means for removably mounting the second layer to the permanently framed layer comprise a plurality of novel retaining means which are uniquely mounted to the metal frame holding the particulate filter media and include vertically movable gripping or engaging means to removably fix the second filter layer in operative position overlying the permanently mounted filter layer.

OBJECTS

It is therefore an object of the present invention to provide a multiple filter media assembly which combines a permanently framed particulate filter layer with a removably mounted, disposable gaseous filter media in an efficient and economical manner.

It is another object of the present invention to provide a multiple filter media assembly which employs relatively inexpensive mounting means to securely fix the removable filter media in operative position overlying the permanently mounted media in a simple and facile manner.

It is still another object of the present invention to provide a filter construction of the type described wherein the retaining means for removably mounting the disposable media layer are fixed within the metal frame during the normal manufacture and assembly of the permanent filter media within the frame.

It is a further object of the present invention to provide a filter construction of the type described wherein the disposable filter media may be conveniently and quickly manually removed and replaced and yet offers a pleasing and attractive appearance to the consumer.

Further objects and advantages of the present invention will be apparent from the following description, reference being had to the accompanying drawings wherein preferred forms of embodiments of the invention are clearly shown.

In The Drawings

DETAILED DESCRIPTION

Figure 1:
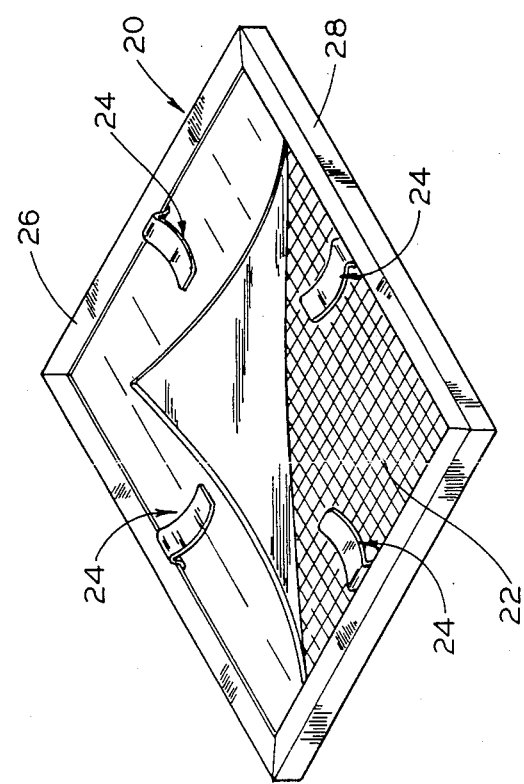
FIG. 1 is a perspective view of a preferred embodiment of a multiple filter media assembly constructed in accordance with the present invention.
Figure 2:
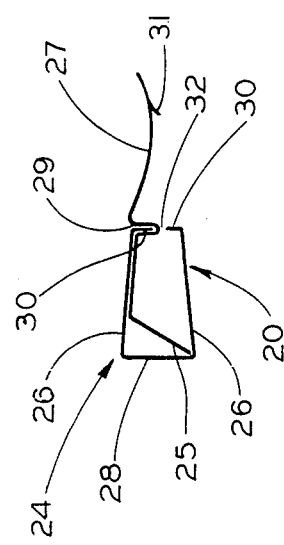
FIG. 2 is a cross-sectional elevational view of the frame and the gripping members of the embodiment shown in FIG. 1 illustrating the filter media removed therefrom, the section being taken on a vertical plane adjacent to one of the retaining members.

A multiple filter media assembly constructed in accordance with the present invention is illustrated in FIGS. 1 and 2 and includes a generally rectangular metal frame, indicated generally at 20, for permanently mounting one or more layers of a particulate filter media 22.

Preferably, the filter media 22 comprises a plurality of layers of expanded metal which form a long-lasting, re-usable particulate filter. The construction of frame 20 and media 22 are old and well-known in the trade and have been used for many particulate filter applications. One typical application for such filters is in range hoods for the removal of grease aeresol generated while cooking. Since the frame is a relatively costly item, such a frame and filter construction may be removed, cleaned and reused many times. However if the filter is damaged or otherwise becomes unusable, the frame and filter must be replaced because of the permanent nature of the construction.

In applications wherein it was desired to also include gaseous filter media for odor removal, the prior art employed a combination of particulate and gaseous filter media permanently mounted in the same frame. However, this type of construction is less satisfactory as the gaseous media possesses a significantly shorter useful life than the particulate media. Therefore, the user is left without effective odor removal or must replace the total filter assembly, including the expensive frame and particulate media.

In accordance with the present invention, permanent frame 20 is provided with a plurality of retaining members, indicated generally at 24, which form an auxillary filter media retaining means. Retaining members 24 comprise a strip of resilient material, preferably spring steel for example, which is pre-formed into a predetermined configuration such as shown in FIGS. 1 and 2.

Frame 20 is normally formed by a conventional bending method wherein top, bottom and rear walls are created along fold lines joining the top and bottom walls to the rear wall.

The top and bottom walls 26 are also provided with an inwardly turned lip 30, which upon assembly, forcefully engage the edges of the layers of particulate filter media 22 which is positioned within a channel 32 formed between the walls 26 and 28 of frame 20.

In the manufacture of a conventional frame 20, bottom wall 26 and rear wall 28 are formed essentially as shown, however, top wall 26 is only partially bent downwardly toward the final position shown in FIG. 2. At this point of the conventional assembly method, the outer edges of layer 22 of the particulate filter media are positioned within channel 32.

The conventional assembly is then completed by a conventional bending press apparatus which closes top wall 26 to its final position wherein the layer 22 of particulate filter media is engaged and held between the lips 30 provided on top and bottom walls 28.

However, in accordance with the present invention, a retaining member 24, which preferably comprises a strong resilient strip of material, is inserted with its rear portion 25 disposed within a channel 32 prior to closing top wall 26 with the outer finger portion 27 extending outwardly from frame 20 over the upper surface of layer 22.

The members 24 are preformed and dimensioned proportionally to the dimension of frame 20 such that lip 30 on the top wall 26 will enter a recess 29 in member 24 upon closing top wall 26 to the final assembled position as shown in FIGS. 1 and 2. In addition to fixing the edges of layers 22 within channel 32 of frame 20, this procedure also secures each retaining member 24 within the respective channels 32 along each side of frame 20 and biases the concave curvature of finger portion 27 into engagement with the upper surface of layer 22. With members 24 assembled as described herein, a layer of gaseous filter media 34 of proper dimensions may be easily positioned in overlying relationship with layer 22 by sliding an edge thereof under the finger 27 of member 24. This is accomplished by slightly raising the outer end of finger 27 to provide clearance to position the layer 34 flat over the surface of layer 22 with the outer edges of layer 34 generally coinciding with the inner edge of frame 20.

Gaseous filter media layer 34 typically may comprise a non-woven sheet of synthetic fibers or expanded and slit paper filter media which may be impregnated with activated charcoal for odor, aerosol and further particulates removal.

When removal of layer 34 is required, a similar lifting of finger 27 permits layer 34 to be easily pulled from under fingers 27 and discarded. A replacement layer 34 may then be positioned as described above to provide a new efficient gaseous filter layer. Prior to replacirg layer 34, particulate layer 22 may be cleaned, if needed, by washing with soap and water. Then the whole filter assembly may be returned to its original condition for efficient operation. Typically, the particulate filter will outlast several replacement gaseous filters before replacement of the frame and media layer 22 is required.

In the preferred embodiment shown, the outer end of finger 27 is provided with a tooth or barb 31 to enhance the engagement between the fingers 27 and the removably mounted layer 34.

Figure 3:
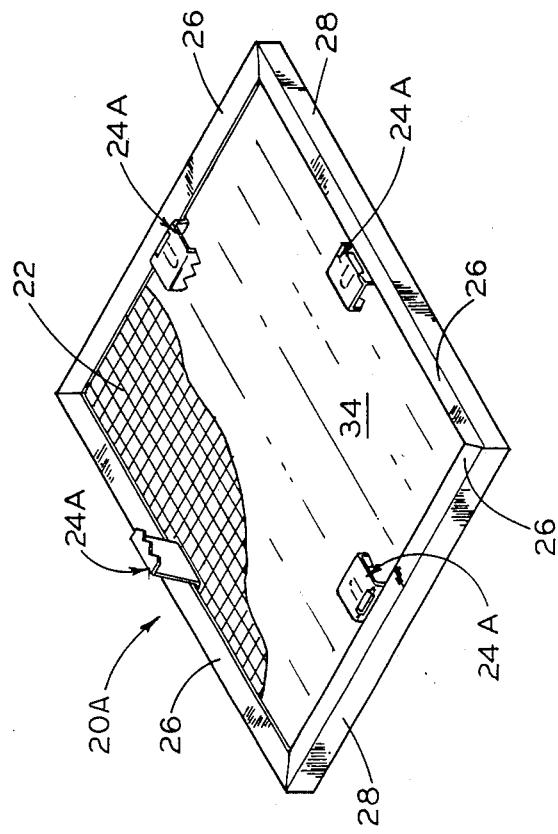
FIG. 3 is a perspective view of another embodiment of the multiple filter media assembly constructed in accordance with the present invention illustrating a modified form of retaining members for removably mounting the disposable filter media.
Figure 4:
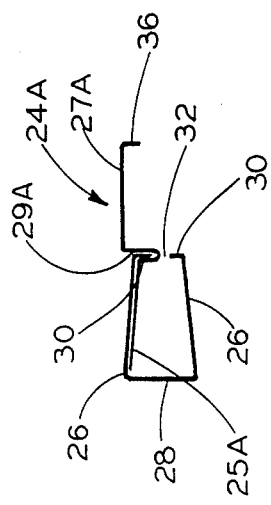
FIG. 4 is a cross-sectional elevational view, similar to that taken in FIG. 2, of the frame and retaining member of the embodiment shown in FIG. 3.

Now referring to the embodiment shown in FIGS. 3 and 4, a modified retaining member 24-A is illustrated. The remaining components of the filter assembly 20-A are identical to those shown in FIGS. 1 and 2 and therefore are indicated by the identical reference numerals.

The modified retaining member 24-A comprises a strip of metal which has significantly less inherent resiliency as compared to member 24. Therefore it may be raised or lowered between unbiased open and closed positions by vertical movement beyond its elastic limit.

Member 24-A is pre-formed to assume the configuration shown in FIGS. 3 and 4 and includes an inner portion 25-A which is inserted into channel 32, an outer finger portion 27-A and a recess 29-A. Member 24-A is assembled within frame 20-A in the same manner as previously described relative to member 24. Lip 30 of top wall 26 is similarly inserted into engagement with the bottom of recess 29-A to force it into engagement with the media layer 22 also assembled in channel 32. Lip 30 of top wall 26 also anchors retaining member 24-A such that it may be bent upwardly or downwardly along the outer raised edge of recess 29-A.

The nature of the metal strip forming member 24-A is by design easily bent beyond its elastic limit to an open position or a closed position into engagement with a media layer 34 positioned over the surface of layer 22 such as best seen in FIG. 3.

The finger portion 27-A also has a modified configuration in view of its operation and includes a downturned lip 36 which is serrated to more firmly grip layer 34 when finger 27-A is closed down upon layer 34.

The nature of the construction of member 24-A makes it somewhat easier to replace a new layer 34 as compared to member 24 in that the finger 27-A may be raised to an stable position providing more clearance to properly place layer 34 in its operative position overlying layer 22.

However, finger 27-A will not automatically engage layer 34 and must be manually bent downwardly and pressed into engagement with layer 34 to fix layer 34 in the assembly.

In view of the foregoing description, it should be understood that the filter assembly of the present invention provides a significant improvement over the prior art by providing an efficient and cost effective unitary construction having both a permanently framed filter media and a removably mounted filter media which operates in a simple and relatively easy manner.

What is claimed is:

1. A multi-stage air filter assembly for particulate and gaseous contaminants comprising, in combination, a particulate filter media forming a first filter layer having its outer edges disposed within a metal frame means having rear, top and bottom walls; each of said top and bottom walls provided with a lip portion turned toward one another to define an opening of a channel between said walls adapted to receive the outer edges of said particulate filter media in force-transmitting engagement; a second layer of filter media including a gaseous adsorption constitutent disposed in freely overlying relationship to said layers of particulate filter media; and a plurality of retaining means mounted within said channel of said frame means, each of said retaining means including an outwardly extending finger movable between an engaging and non-engaging position relative to said second layer of filter media to removably mount said second layer in said overlying relationship to said first layer in an operative relationship thereto.

2. The filter assembly defined in claim 1 wherein said finger of retaining means is biased in said engaging position relative to said second layer of filter media and is movable to said non-engaging position by a force greater than said bias to provide a clearance between said first layer and said finger for movably positioning said second media layer between said engaging and non-engaging positions.

3. The filter assembly defined in claim 1 wherein said retaining means comprises a unitary strip having an inner portion provided with at least a top wall and rear wall mounted within said channel of said metal frame means and wherein said outwardly extending finger has a generally concave configuration biased downwardly into said engaging position relative to said second layer, and a recess extending parallel to said top wall of said frame means, said turned lip portion on said top wall of said frame means being disposed within said recess to secure said retaining means in an operative position.

4. The filter assembly defined in claim 1 wherein said retaining means comprises a metallic strip having a rear portion extending within said channel of said frame means parallel and closely adjacent to the top wall of said frame means, and said outwardly extending finger extends generally parallel to said first layer, and a recess between said rear portion and said outwardly extending finger; said turned lip of said top wall of said frame means being inserted in force-transmitting engagement into said recess to secure said retaining means to said frame means, said outwardly extending finger being vertically movable beyond its elastic limit to an open position defining non-engagement with said second layer and a closed position defining engagement with said second layer.

* * * * *